US012653341B2

(12) United States Patent
Bonnaerens

(10) Patent No.: US 12,653,341 B2
(45) Date of Patent: Jun. 16, 2026

(54) CHARCOAL BARBECUE HAVING AN INTEGRATED COAL STARTER

(71) Applicant: LIVWISE, Deinze (BE)

(72) Inventor: Wietse Bonnaerens, Lokeren (BE)

(73) Assignee: LIVWISE, Deinze (BE)

( * ) Notice: Subject to any disclaimer, the term of this patent is extended or adjusted under 35 U.S.C. 154(b) by 412 days.

(21) Appl. No.: 18/561,948

(22) PCT Filed: Apr. 29, 2022

(86) PCT No.: PCT/IB2022/053983
§ 371 (c)(1),
(2) Date: Nov. 17, 2023

(87) PCT Pub. No.: WO2022/243770
PCT Pub. Date: Nov. 24, 2022

(65) Prior Publication Data
US 2024/0237853 A1　　Jul. 18, 2024

(30) Foreign Application Priority Data

May 18, 2021　(BE) .................................. 2021/5402

(51) Int. Cl.
*A47J 37/07* (2006.01)
(52) U.S. Cl.
CPC ......... *A47J 37/0704* (2013.01); *A47J 37/079* (2013.01)
(58) Field of Classification Search
CPC .............................. A47J 37/0704; A47J 37/079
See application file for complete search history.

(56) References Cited

U.S. PATENT DOCUMENTS

| | | | |
|---|---|---|---|
| 3,167,040 A | 1/1965 | Byars, Sr. et al. | |
| 3,934,520 A | 1/1976 | Brennan et al. | |
| 4,763,640 A | 8/1988 | Schnack et al. | |
| 5,197,455 A | 3/1993 | Tessien | |
| 5,425,352 A * | 6/1995 | Gillam ................ | A47J 37/0763 99/450 |
| 5,875,772 A * | 3/1999 | Saey .................... | A47J 37/0704 126/25 B |
| 10,667,650 B2 | 6/2020 | Denning | |
| 2004/0154603 A1* | 8/2004 | Crawford .............. | A47J 37/079 126/25 B |

(Continued)

OTHER PUBLICATIONS

International Search Report from corresponding PCT Application No. PCT/IB2022/053983, Sep. 1, 2022.

(Continued)

*Primary Examiner* — Alfred Basichas
(74) *Attorney, Agent, or Firm* — Workman Nydegger

(57) ABSTRACT

A charcoal barbecue, includes: a tub mounted on one or multiple legs, such that at least one opening is present in the bottom of the tub adapted for outflow of formed ashes; an assembly with combined coal starter and ashtray function, adapted to be suspended below the opening by means of a detachable connection, the assembly including: a coal starter, having a tubular wall, including one or multiple holes arranged in the wall, opening at both opposite ends of the tubular wall, and a grid positioned inside the tubular wall, an insert, adapted to be removably positioned at least partially inside the tubular wall, such that in positioned state of the insert the assembly forms an ashtray with closed bottom.

14 Claims, 13 Drawing Sheets

(56) References Cited

U.S. PATENT DOCUMENTS

| | | | |
|---|---|---|---|
| 2009/0025574 A1* | 1/2009 | Byrnes ................ | A47J 37/0704 |
| | | | 426/523 |
| 2012/0090593 A1 | 4/2012 | Urquhart et al. | |
| 2014/0338653 A1 | 11/2014 | Chung | |

OTHER PUBLICATIONS

Belgian Search Report from corresponding BE Application No. 202105402, Feb. 4, 2022.

"Charcoal BBQ", Barbecook, 10 pages, retrieved from https://www.barbecook.com/collections/charcoal-bbq on Nov. 17, 2023.

"Lighting Your Barbecue in a Safe, Simple and Quick Way: The QuickStart System.", Barbecook, 6 pages, retrieved from https://www.barbecook.com/blogs/bbq-inspiration/lighting-your-barbecue-in-a-safe-simple-and-quick-way-the-quickstart-system?_pos=1&_sid=cb757e4b2&_ss=r on Nov. 17, 2023.

\* cited by examiner

CHARCOAL BARBECUE HAVING AN INTEGRATED COAL STARTER

TECHNICAL AREA

The present invention generally relates to a charcoal barbecue. The invention provides in particular a solution for starting coal, which is integrated in the barbecue device, and is simple and flexible to use.

BACKGROUND OF THE INVENTION

In the case of a charcoal barbecue, pieces of meat or vegetable are cooked by means of heat coming from glowing coals or briquettes. For lighting the barbecue, typically use is made of ignition means such as firelighters or wood shavings. The latter are placed in the tub of the barbecue between the coals or briquettes and lit, after which one waits until the coals or briquettes glow and have a white ash layer. Often a facility is present at the barbecue to collect and discharge ashes forming during barbecuing. For example, in U.S. Pat. No. 4,763,640 a central opening in the tub of the barbecue and an underlying ash collector is used.

Typical of a charcoal barbecue is that it may take a long time before the coals or briquettes glow sufficiently and one may start barbecuing. Therefore, solutions are proposed in the state of the art to speed up that starting phase. For example, a so-called coal starter, a separate device, independent from the actual barbecue, is used which allows to make coals glow quickly before using them in the barbecue. Examples of such an individual coal starter are described in U.S. Pat. Nos. 3,167,040, 3,934,520 and 5,197,455. An individual coal starter typically consists of a tube having a grid therein on top of which coals are placed. The tube portion below the grid is filled with paper that is lit, or the tube is placed over lit firelighters. Holes in the lower portion of the tube wall ensure the supply of air, and the tube acts as a chimney in which draft is created. In that way, heat of the combustion at the bottom is optimally distributed over the coals placed on the grid, such that the latter start to glow quickly. The glowing coals are then transferred to the tub of the actual barbecue. The principle of this coal starter has been known already for a long time, but forms until today an efficient way of starting the coals quickly. A disadvantage is, however, that the coal starter has become very hot after use and may therefore not simply be put aside. For example, placing it on the lawn carries a fire risk and a risk of damaging the lawn, or placing the hot coal starter on the terrace may cause damage to the tiles. Putting aside the hot coal starter should also be done carefully, such that the user does not burn himself. These aspects hamper the use of an individual coal starter. Furthermore, the coal starter is an optional device to be bought separately, such that many users will not have it at home or will not even know about it.

In US2014/0338653A1 a solution is presented wherein a coal starter may be suspended below the tub of the barbecue. The coal starter comprises a tube wherein a plate with holes is present. To prevent that—during barbecuing, the coal starter being suspended below the tub—falling ashes would pass through the holes in the plate of the coal starter, a second plate is positioned inside the tube. The second plate also comprises holes. By pivoting the second plate with respect to the first plate, the holes in both plates can be aligned, thereby allowing air transfer during use as coal starter. On the other hand, a position of both plates is possible wherein the holes of both plates are not aligned, thereby stopping falling ashes. However, as the two plates need to be pivotable relative to one another, always some gap will be present between both plates, such that a portion of the falling ashes may possibly escape from the suspended coal starter. Moreover, the number and shape of the holes in both plates need to match; as a result, the first plate cannot contain a finely meshed grid, wherein it would be impossible to cover all the small openings. This adversely affects the air throughput during use as a coal starter. Finally, the pivot mechanism uses moving parts, which may jam, thereby making the design less robust and reliable.

Furthermore, solutions are known in which a starting system is integrated in the barbecue device, such that a compact solution is obtained without the need of an additional device. For example, in US20120090593A1 a recipient is present below a central opening in the tub of the barbecue. A grid is located inside the recipient on top of which ignition material is placed. The ignition material is lit, and the heat produced thereby results in a quicker start of the coals lying on top in the tub of the barbecue. The ashes produced by the combustion of the ignition material are collected in the recipient. Also, the Barbecook quickstart rt system, described at https://www.barbecook.com/benl/barbecues/houtskool-bbq/and https://www.barbecook.com/be-nl/je-barbecue-aanmaken-op-een-veilige-en-snelle-manier-het-quickstart-systeem makes use of a similar principle. The system comprises a central tube below the tub of the barbecue. Newspapers are placed inside the tube, and subsequently lit. The heat of the combustion ensures a quicker start of the coals in the tub of the barbecue. A disadvantage of such an integrated system is that one cannot choose which coal zones in the tub are to be lit, for example when one wants to create zones having different temperatures. Furthermore, the system may only be used when starting barbecue, not to make additional coals glow while barbecuing. Finally, for some users it is not clear how the system is to be used, often no newspapers are available, and combustion of the paper causes smoke affecting the taste adversely.

It is an object of the present invention to describe a solution which overcomes one or multiple of the described disadvantages of solutions from the state of the art. More specifically, it is an object of the present invention to describe a solution for starting coals, which is integrated in a charcoal barbecue, and which is simple and flexible to use.

SUMMARY OF THE INVENTION

According to the present invention, the goals identified above are realized by a charcoal barbecue comprising:
- a tub mounted on one or multiple legs and adapted to place pieces of solid fuel, wherein at least one opening is present in the bottom of the tub adapted for outflow of formed ashes;
- an assembly with combined coal starter and ashtray function, adapted to be suspended below the opening by means of a detachable connection, the assembly comprising:
  - a coal starter comprising a tubular wall, having one or multiple holes arranged in the wall, openings at both opposite ends of the tubular wall, and a grid positioned inside the tubular wall,
  - an insert, adapted to be removably positioned at least partially inside the tubular wall, such that in a positioned state of the insert, a closed bottom is formed inside the tubular wall,
  - wherein the assembly is such that:

by positioning the insert and suspending the assembly below the opening, the assembly functions as an ashtray, being adapted to collect ashes falling from the opening, and by detaching the assembly and removing the insert, the coal starter is obtained, being adapted to heat pieces of solid fuel when the pieces are placed on the grid of the coal starter.

In other words, the invention relates to a charcoal barbecue. A barbecue or grilling device refers to a device typically for outside use, whereby food such as meat or vegetables are cooked on a grid by means of an underlying heat source. A charcoal barbecue refers to a type of barbecue in which the heat source is formed by glowing pieces of solid fuel. Examples of pieces of solid fuel are coals, charcoal, i.e. pieces of carbonized wood, charcoal briquettes, i.e. grinded charcoal which is pressed in a shape using a binder, coconut briquettes, etc. During use the barbecue is in a upright state. The direction perpendicular to the ground plane is defined as the vertical direction or height direction. Terms such as below, above, bottom, top, bottom side, top side, etc. always refer to the upright state of the barbecue.

The charcoal barbecue comprises a tub in which the coals are placed. The tub, also called kettle or tray, is typically mounted at a height on one or multiple legs. The tub has an open top, in which the grid carrying the food to be cooked is positioned during barbecuing. The coals rest on the bottom of the tub, located at the bottom side of the tub. At least one opening is present in the bottom of the tub, typically centrally in the bottom of the tub, allowing ashes forming from the coals during barbecuing to leave the tub. Optionally multiple of such outflow openings may be present.

The charcoal barbecue comprises furthermore an assembly. An assembly refers to an ensemble consisting of multiple individual elements. The assembly within the invention comprises a coal starter and an insert and has a combined coal starter and ashtray function; thus, it may fulfill both the function of a coal starter, namely lighting not yet glowing coals, and the function of ashtray, namely collecting ashes forming from the coals during the use thereof while barbecuing.

The assembly is adapted to be suspended below the opening in the tub of the barbecue by means of a detachable connection. The assembly may thus be suspended and may also be easily detached again. In the suspended state, the assembly is located below the bottom of the tub, more precisely below the outflow opening(s) in the bottom of the tub. In an embodiment, there is no direct contact between the assembly and the bottom of the tub, but there is another element, for example an air supply, located between the assembly and the tub. In another embodiment, the assembly is suspended directly below the tub and there is contact between the assembly and the bottom of the tub in the suspended state. A detachable connection may be performed in various ways, for example through a sliding system, a click system, hooks, etc.

The assembly comprises a coal starter. The coal starter comprises a tubular wall. A tubular wall refers to a delimitation extending in an axial direction or length direction, and which is closed circumferentially. Typically, the tubular wall has a central axis in the axial direction or length direction, and the wall is axially symmetrical. The cross section of the wall, taken perpendicular to the axial direction, may adopt various shapes. In an embodiment, the wall is cylindrical, having a round cross section. In another embodiment, the cross section is square or rectangular, or may adopt any other shape. The cross section may be the same at each axial position, such as in case of a cylinder, or may have a different shape or surface at different axial positions, such as in case of a cone.

The coal starter has openings at opposite ends of the tubular wall. The ends are opposite seen along the length direction or axial direction of the tube. The tube defined by the wall is thus not closed at one or both ends. The wall defines thus an open inner space, without having a bottom or lid at one of its ends.

One or multiple holes are arranged in the tubular wall of the coal starter. This means that, seen along the circumferential direction of the wall, at least one hole is present. Thus, the holes do not refer to the open ends of the tube, but to openings present in the wall itself; the wall of the tube is in other words pierced by one or multiple holes.

The coal starter comprises furthermore a grid. A grid refers to an element that is on the one hand adapted to carry or support objects, and that contains on the other hand openings through which air may flow. Typically, a grid is built from multiple parallel bars separated from each other, optionally supplemented with a second set of parallel bars perpendicular to the first set. In another embodiment, the grid consists of a plate in which a large amount of holes is applied. In an embodiment, the upper surface of the grid is flat, positioned according to a horizontal plane. In another embodiment, the upper surface of the grid has one or multiple slopes. The upper surface of the grid is for example conical. The grid is positioned inside the tubular wall of the coal starter. This means that there is a passage for air present through the tube: through the holes in the tube wall, further through the grid, and further through the other open end of the tube. For example, the grid is attached to the inside of the tubular wall. In another embodiment, the grid is not attached to the wall, but is supported in another way, for example from below. In each of the embodiments the grid adopts a fixed position with respect to the tubular wall in a mounted state.

Apart from the coal starter, the assembly also comprises an insert. The insert is adapted to be positioned detachably inside the tubular wall of the coal starter. Thus, the insert forms a separate element, and may be positioned in the coal starter and removed there from again. Various embodiments are possible. For example, the insert has the shape of a bucket, pot, bowl or bin. In such embodiments, the insert is delimited by a bottom and an upright wall. After positioning the insert in the coal starter, by sliding the pot or bucket into the tubular wall, the bottom of the insert is located inside the tubular wall of the coal starter; the upright wall is also completely or partially located inside the tubular wall. For example, the pot is suspended in the coal starter, wherein an edge or rim of the pot is supported by an edge or rim of the tubular wall of the coal starter. In another embodiment, the insert consists of a plate which is slid into the coal starter along an open end of the tubular wall. In yet other embodiments, the insert is a plate attached at the bottom of the tubular wall or slid into the tube through the wall of the coal starter. Within the various embodiments, the insert is loosely lying or hanging in the coal starter; the insert is supported by a part of the coal starter, but no additional elements like screws are present to make the connection between the insert and the coal starter.

In each embodiment, a closed bottom is formed inside the tubular wall by positioning the insert. This means that after positioning the insert there is no longer a passage present from the one open end of the tubular wall to the other; that passage is blocked by the bottom created by the insert. In various embodiments, the bottom is created at any length position of the tubular wall; the bottom may for example be created at an end of the tube, or at a more central length position. In an embodiment, when the insert is a plate without openings there is one cross section of the tube which is fully closed by the insert. In another embodiment, when the insert is a bucket or pot with a closed bottom, the bottom of the pot or bucket occupies only part of a tubular cross section, and the upright wall of the pot or bucket contributes also to blocking the passage. In each of the embodiments, the assembly becomes an ashtray having a closed bottom by positioning the insert: ashes introduced through the one open end fall on the bottom created inside the tubular wall.

The assembly forms a 2-in-1 element that may function as ashtray and may function as coal starter. Indeed, in the starting phase, when lighting the coals, it serves as coal starter: by detaching the assembly and removing the insert, a classical individual coal starter is obtained. This means that, for lighting fresh coals, the assembly is not used in the suspended state, but should be detached first. Moreover, the insert is removed. Thus, during use of the coal starter, the insert is not present inside the tubular wall. The coal starter is adapted to heat pieces of solid fuel, when said pieces are placed on the grid of the coal starter. The grid of the coal starter, which is located inside the tubular wall, is therein adapted to carry or support pieces of solid fuel, such as coal. In that way, a lighting means may be lit in the space below the grid, and air is drawn through the holes in the tubular wall, such that draft is created inside the tubular wall of the coal starter. The coal starter may thus be employed in the usual way: fresh coals are placed on the grid of the coal starter, a lighting means is arranged in the space below the grid, the lighting means are lit, and the tubular wall of the coal starter acts as chimney to optimally distribute heat over the coals. Afterwards the lit coals are poured in the tub of the barbecue.

The coal starter is thus used as an individual coal starter. The individual coal starter may be used at a location away from the actual barbecue or positioned on top of the barbecue grid: for example, the firelighters are placed on the barbecue grid and the coal starter is positioned over the firelighters. Ashes due to combustion of the firelighters then fall in the tub of the barbecue. In an embodiment, the insert, which is executed as a pot or bucket, is itself also adapted to be separately suspended below the opening of the tub. In that case, during the use of the coal starter on top of the grid of the barbecue, ashes due to the combustion of firelighters, or optionally due to already heated coals present in the tub of the barbecue, are collected in the suspended insert. In another embodiment, the insert is not in use during lighting the coals by means of the coal starter.

In the barbecue phase, i.e. during actual cooking of food on the barbecue, the assembly acts as ashtray: the insert is placed inside the coal starter, and this ensemble is suspended below the tub of the barbecue. This means that, during actual barbecuing, after the coals have been lit and placed in the barbecue tub, the assembly is suspended below the opening of the tub and functions herein as ashtray. In the suspended state, the insert is positioned in the coal starter, such that a bottom collecting falling ashes is created. These ashes arise from the glowing coals during actual barbecuing. In that way, ashes arising from the flowing coals while barbecuing are collected in the suspended assembly.

The insert allows to switch the function of the assembly between an ashtray function and a coal starter function. By placing the insert, namely by sliding a closed plate or pot with closed bottom at least partially into the tubular wall, the ashtray function is obtained. Switching to the coal starter function happens by removing the insert, namely by sliding the plate or pot out of the tubular wall.

The invention is accompanied by various advantages. Firstly, the assembly provides a solution for both collecting ashes and for starting coal. The assembly is herein integrated inside the charcoal barbecue in a compact manner, so no additional space is required. Furthermore, no separate devices, such as a separate individual coal starter, are required to fulfill the start function. This ensures that everyone purchasing the charcoal barbecue disposes over a suitable start system as well.

Additionally, the coal starter is easy to use; since the operating principle is the same as for a classical individual coal starter, many users are already familiar with its operation. Furthermore, such a type of coal starter provides a robust and efficient way to light coals, without the need of complex components. Finally, the coal starter may within the invention easily be suspended below the barbecue tub after use; consequently, there is no risk of fire or damage by after use putting aside a hot coal starter on the lawn or terrace.

Furthermore, the coal starter allows within the invention for a high degree of flexibility. On the one hand, the coal starter may be detached at any moment while barbecuing and used to light additional coals. It may therefore not only be used during the initial starting phase, but also during actual barbecuing, when there is a need for an additional amount of glowing coals. On the other hand, flexibility is offered with respect to the position in the tub where the glowing coals are added: zones may be selected where there is a need for additional heat, to then add additional coals only there. In that way, it is possible to create various heat zones on the barbecue, as a function of various specific dishes or ways of preparation.

Furthermore, ashes arising during barbecuing are easily collected inside the ashtray formed by the suspended assembly. This contributes to easier cleaning of the tub after use of the barbecue. Furthermore, the detachability of the assembly and removability of the insert ensure for an easy emptying of the ashtray. Finally, the coal starter forms a heat shield during barbecuing, shielding the user from the heat coming from the collected hot ashes.

Moreover, as the insert is completely removed before using the coal starter, the design of the coal starter may fully be focused on the coal starter function itself, without having to take into account the ashtray function. For example, a finely-meshed grid can be used within the coal starter, this being optimal for heating pieces of fuel during lighting. On the other hand, also for the insert a simple design may suffice, allowing to create an ashtray with a perfectly closed bottom. After placing the insert inside the tubular wall, not any gaps remain through which ashes could escape. In other words, both functions are completely decoupled and both parts of the assembly can be optimally designed for their own function.

Finally, switching from one function to the other function merely happens by positioning and removing the insert. No complex movements or mechanical systems are needed. As such, a robust and reliable solution is obtained.

Optionally, the assembly is adapted to switch between the coal starter and ashtray function, wherein the ashtray function is obtained by sliding the insert at least partially into the tubular wall, and the coal starter function is obtained by sliding the insert out of the tubular wall. Positioning and removing the insert thus occurs through a sliding movement.

Therefore, no rotating movements or complex mechanisms are required for switching between both functions.

Optionally, the coal starter comprises an upper and lower portion, separated from each other by the grid of the coal starter, wherein the upper portion is delimited by a first portion of the tubular wall, and the lower portion is delimited by a second portion of the tubular wall, and wherein the length of the first portion, measured along the central axis of the tubular wall, is greater than the length of the second portion. The upper portion of the coal starter forms thus a space delimited by a first portion of the tubular wall, and by the upper surface of the grid of the coal starter. That upper surface may for example be flat or conical. The upper portion is thus the space in which the coals to be lit are placed. The lower portion of the coal starter forms a space delimited by the upper surface of the grid and a second portion of the tubular wall. It is thus the space below the grid of the coal starter where the lighting means is placed. During use of the coal starter, in the upright state of the coal starter, the upper portion is located on top, and the lower portion at the bottom. The length of the first portion, measured in axial direction or length direction, is greater than the length of the second portion. This means that the grid is not positioned at half length in the tube of the coal starter, but that there are two parts of unequal length. The lower portion has herein a shorter length than the upper portion. This allows that a pile of coals is placed on the grid of the coal starter, and contributes to an optimal distribution of heat over the coals to be lit.

Optionally, at least some of the holes are located in the second portion of the tubular wall. This means that there are definitely one or multiple holes present in the wall of the shortest portion of the coal starter. In the upright state of the coal starter that is the lower portion. This one or multiple holes ensure that when using the coal starter, air may be drawn from the surrounding. This then flows upward through the grid and the upper portion of the coal starter. This ensures the optimal distribution of heat over the coals to be lit. In an embodiment, holes are also present in the wall of the upper, longest portion of the coal starter. In another embodiment, the upper, longest portion of the coal starter has a wall without holes.

Optionally, in a positioned state of the insert, the bottom of the ashtray is located in the upper portion of the coal starter. This means that the bottom created by the insert is located above the grid of the coal starter. In that way, it is avoided that falling ashes fall on the grid of the coal starter when the assembly functions in suspended state as ashtray.

Optionally, the coal starter comprises a connecting element fixedly connected to the tubular wall, adapted to form the detachable connection. This means that a specific element is attached to the wall of the coal starter allowing to suspend the coal starter, with the positioned insert herein, below the barbecue tub. In an embodiment, the connecting element on the coal starter cooperates with a corresponding element on the barbecue to form the detachable connection. The detachable connection is for example formed by a system of slides, clicks, hooks, etc.

Optionally, the coal starter comprises a handle fixedly connected to the tubular wall. A handle allows to handle the coal starter without touching the wall of the coal starter. In that way, it is avoided that a user gets in contact with the hot wall of the coal starter during its use. The handle also allows to detach the suspended assembly easily from the barbecue.

Optionally, the insert comprises a pot, the pot comprising: a closed bottom, an upright wall and an opening located opposite the bottom. A pot refers to a recipient having at least a bottom and an upright wall and being opened at the top. The shape of a cross section of the pot may differ between different embodiments, for example circular, square, etc. Other terms are for example bucket, tray or bowl. The use of a pot as an insert has as advantage in that it may easily be slid into the coal starter, through the open upper end. Because of the upright wall of the insert, it is also allowed that additional holes are present in the wall of the upper portion of the coal starter. Such holes are, in use of the assembly as ashtray, anyhow covered by the wall of the insert. Providing additional holes in the upper portion of the wall of the coal starter has as advantage in that the air supply is improved by the use of the coal starter.

Optionally, in a positioned state of the insert, the wall of the pot is concentric with the tubular wall of the coal starter. This means that after positioning the insert in the coal starter, both have a common center or common central axis. It concerns for example two concentric cylinders.

Optionally, the insert comprises a second connecting element fixedly connected to the wall of the pot, adapted to suspend the pot below the opening in the tub by means of a second detachable connection. This means that on the one hand the assembly, i.e. coal starter with the insert inside, may be suspended detachably, but the insert itself may also be suspended separately. This has as advantage in that during use of the coal starter, with the coal starter positioned on top of the barbecue grid, ashes arising from combustion of the ignition material and falling into the tub, may be collected in the suspended insert. The insert itself, in particular the suspended pot, functions in that moment thus as ashtray. The suspended pot also allows, for example when using the coal starter for lighting an additional amount of coal while barbecuing, that in the meantime ashes arising from the coals already in use are still collected.

Optionally, the charcoal barbecue comprises an air supplying component, the air supplying component comprising a ring having one or multiple holes in the wall of the ring, and wherein the ring is connected to the bottom of the tub, around the opening for outflow of formed ashes. An air supplying component, mounted to the bottom of the barbecue tub, allows to supply air to the glowing coals during barbecuing. Typically, the air supplying component is a ring having holes in the wall of the ring which allow air to pass through. Often the component is controllable, wherein the amount of air reaching the coals may be controlled by means of a mechanical system.

Optionally, the assembly is in suspended state detachably connected to the air supplying component. This means that the air supplying component is fixedly connected to the bottom of the tub, and the assembly hangs below this, by means of a detachable connection. In that way an optimal supply of air to the glowing coals is still possible while barbecuing, while by means of the assembly anyhow the combined coal starter and ashtray function is offered. Moreover, the position of the assembly below the air supplying component ensures that the air flow towards the coals is not disturbed while barbecuing.

Optionally, the charcoal barbecue comprises multiple legs, and the assembly is in suspended state located at a central position between the legs. This means that the assembly is not located in a central leg or barrel but is in suspended state surrounded by multiple legs. This contributes to the stability of the barbecue, also when the assembly is detached.

According to a second aspect of the present invention, the goals identified above are realized by a method for use of a charcoal barbecue, as defined by claim 14, comprising:

providing a charcoal barbecue comprising a tub mounted on one or multiple legs, wherein at least one opening is present in the bottom of the tub;

providing an assembly adapted to be suspended below the opening by means of a detachable connection, the assembly comprising:

a coal starter, comprising a tubular wall, having one or multiple holes arranged in the wall, openings at both opposite ends of the tubular wall, and a grid positioned inside the tubular wall;

an insert adapted to be removably positioned at least partially inside the tubular wall, such that in positioned state of the insert a closed bottom is formed inside the tubular wall;

using the assembly as individual coal starter, comprising:

detaching the assembly, such that it is in a not-suspended state;

removing the insert from the tubular wall;

placing pieces of solid fuel on the grid;

heating the pieces of solid fuel by means of ignition material placed inside the tubular wall below the grid, using the assembly as ashtray, comprising:

positioning the insert at least partially inside the tubular wall, such that an ashtray having a closed bottom is formed;

suspending the assembly below the opening in the tub;

providing pieces of glowing solid fuel in the tub, wherein formed ashes are discharged through the opening in the tub;

collecting ashes in the ashtray, the ashes falling from the opening.

DETAILED DESCRIPTION OF THE EMBODIMENTS

Figure 1:
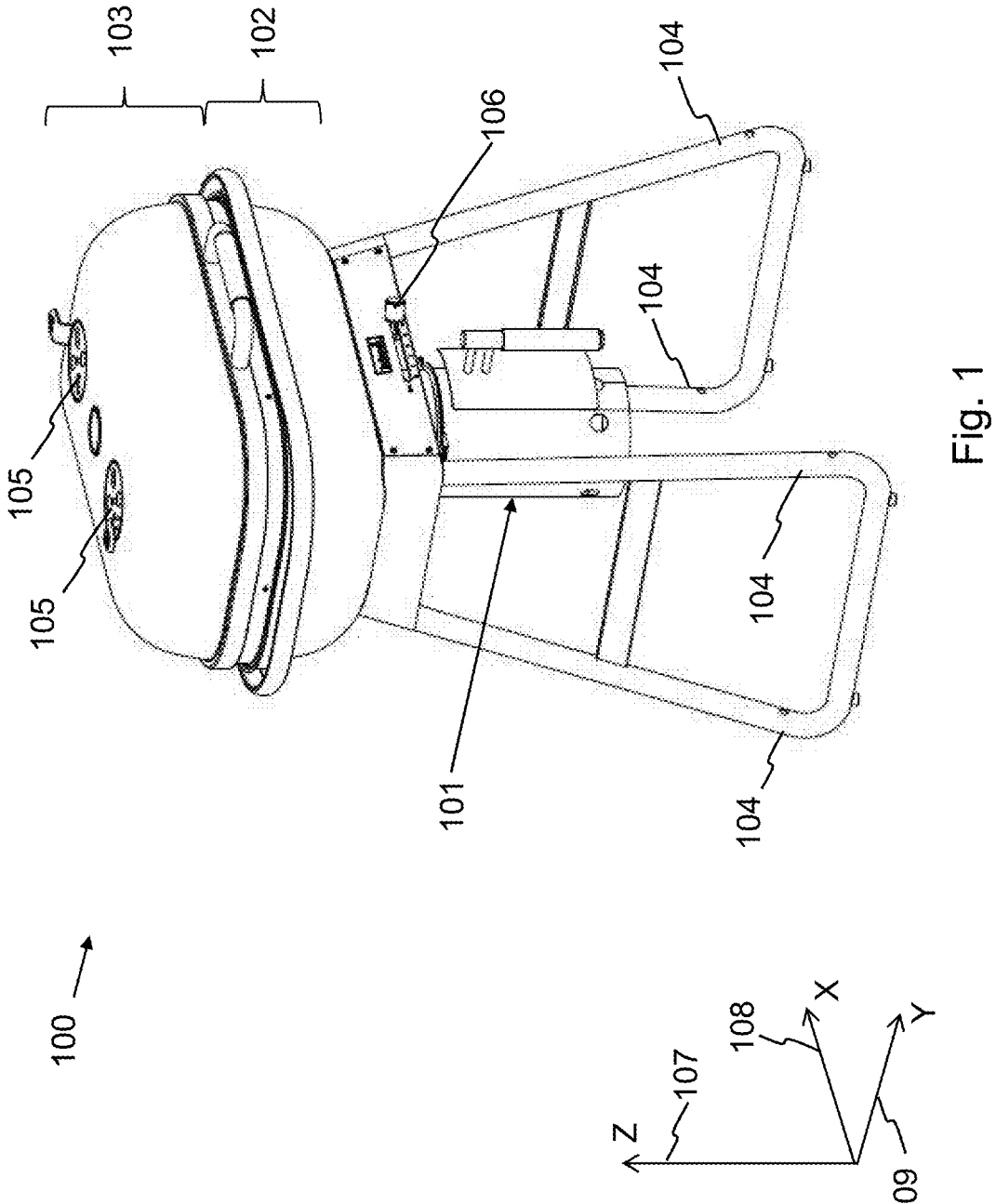
FIG. 1, FIG. 2, FIG. 3 and FIG. 4 show a 3D-view, front view, side view and rear view, respectively, of a charcoal barbecue according to an embodiment of the invention, wherein the assembly is suspended below the tub of the barbecue.
Figure 2:
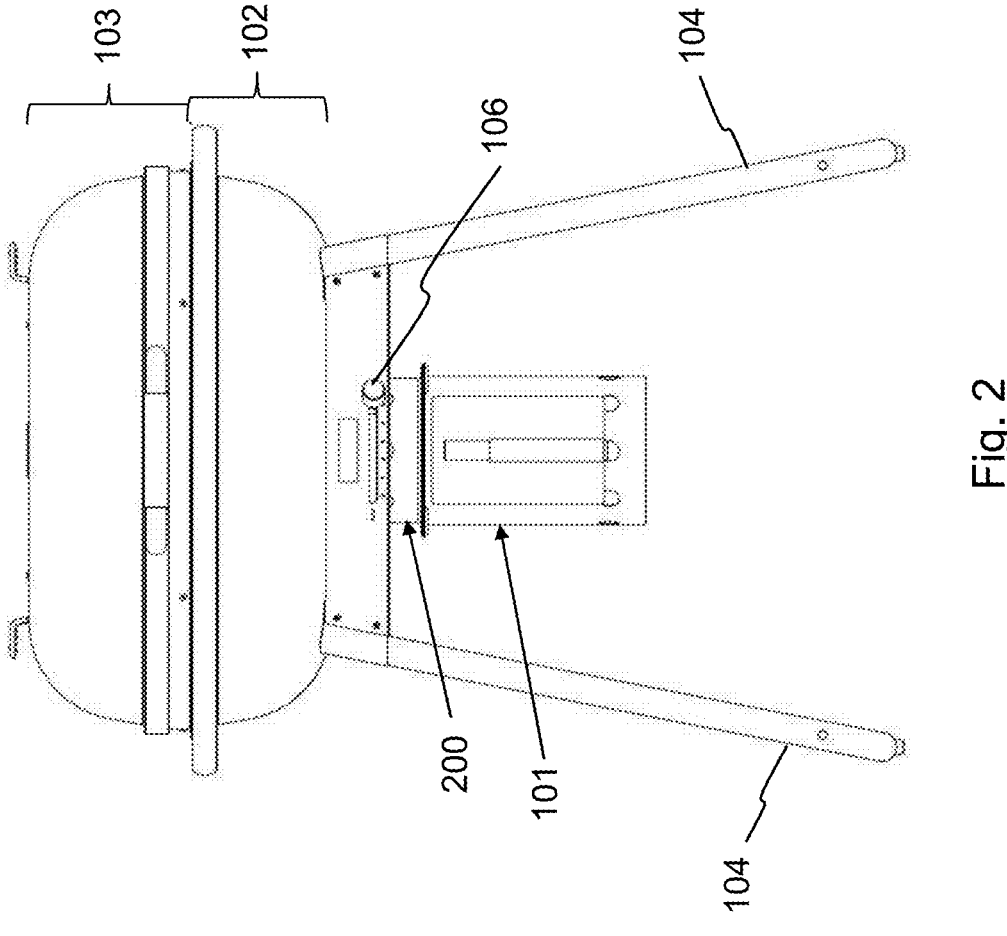
Figure 3:
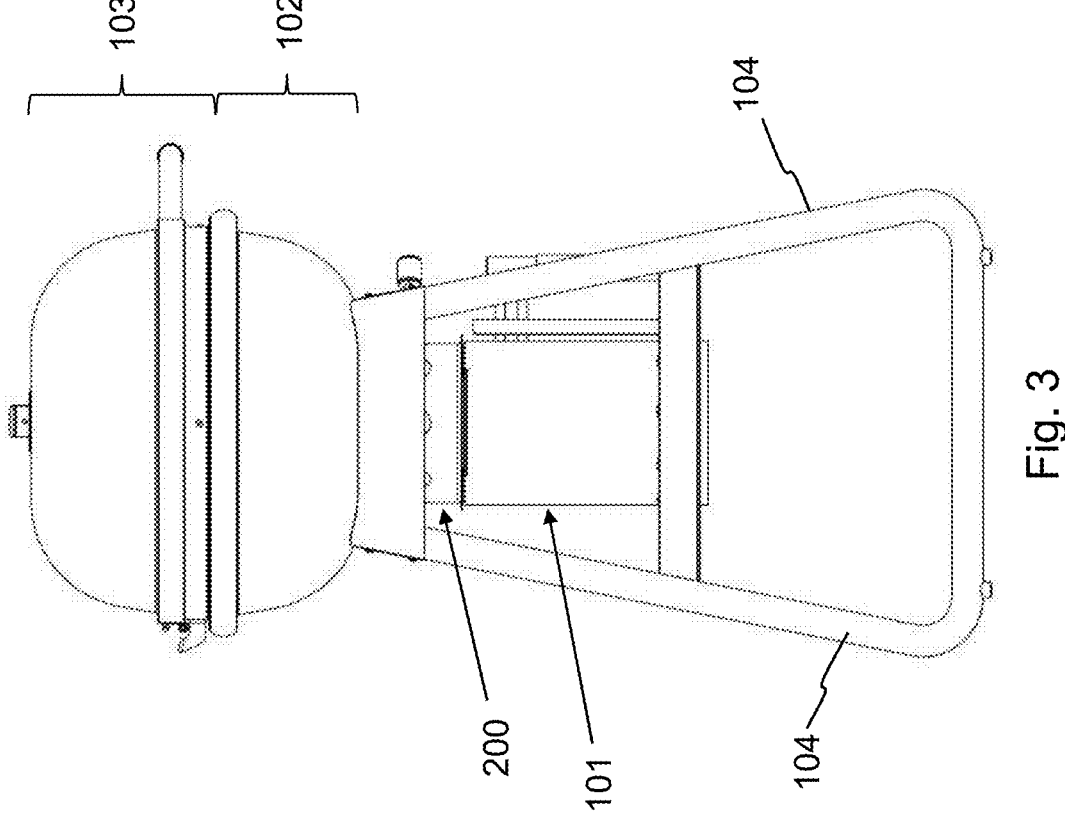
Figure 3:
Figure 4:
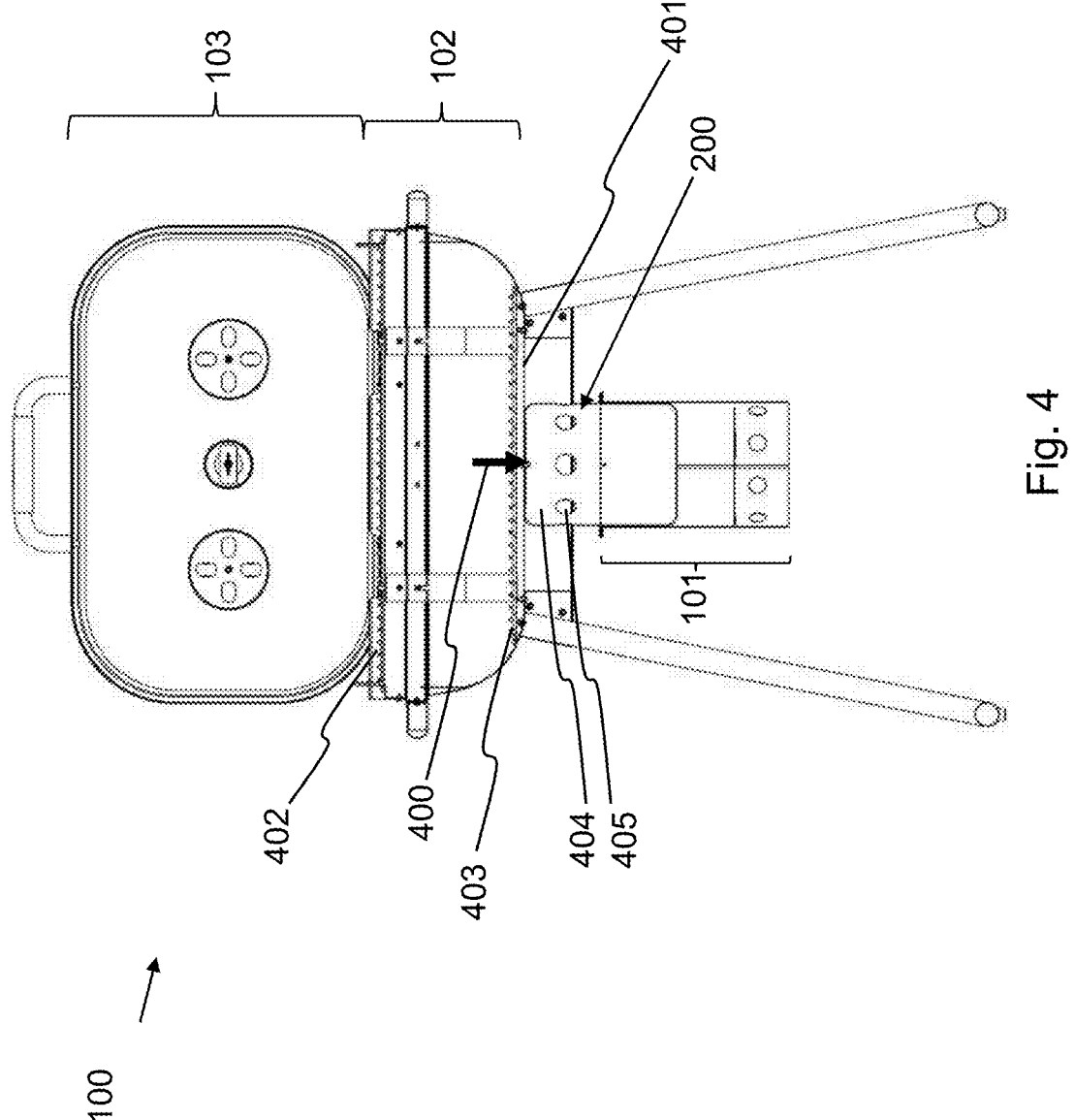

FIG. 1, FIG. 2, FIG. 3 and FIG. 4 show a charcoal barbecue 100 according to an embodiment of the invention. The barbecue 100 is shown in an upright state, wherein the Z-direction 107 is de height direction or vertical direction, the X direction 108 the width direction, and the Y-direction 109 the depth direction. The charcoal barbecue 100 comprises a lid 103, a tub 102 and four legs 104. The tub 102 is adapted to contain coals or another form of pieces of solid fuel during barbecuing. Coals are for example placed in a container 1300 designed especially for that purpose, as is visible in FIG. 13. The container 1300 is thereby positioned on a grid 403 located near the bottom 401 of the tub 102. The barbecue 100 comprises furthermore a grid 402, placed at a higher level in the tub 401, on top of which the food to be cooked is placed. Air supplying openings 105 are provided in the lid 103. The barbecue comprises furthermore an air supplying component 200, which is controllable by means of an operating button 106. An opening is present in the bottom 401 of the tub 102, as is schematically indicated by the arrow 400 in FIG. 4. The air supplying component 200 is fixedly connected to the bottom 401, below the opening 400, and comprises a ring 404 having holes 405. An assembly 101 is suspended below the air supplying component 200, centrally between the legs 104, by means of a detachable connection.

Figure 5:
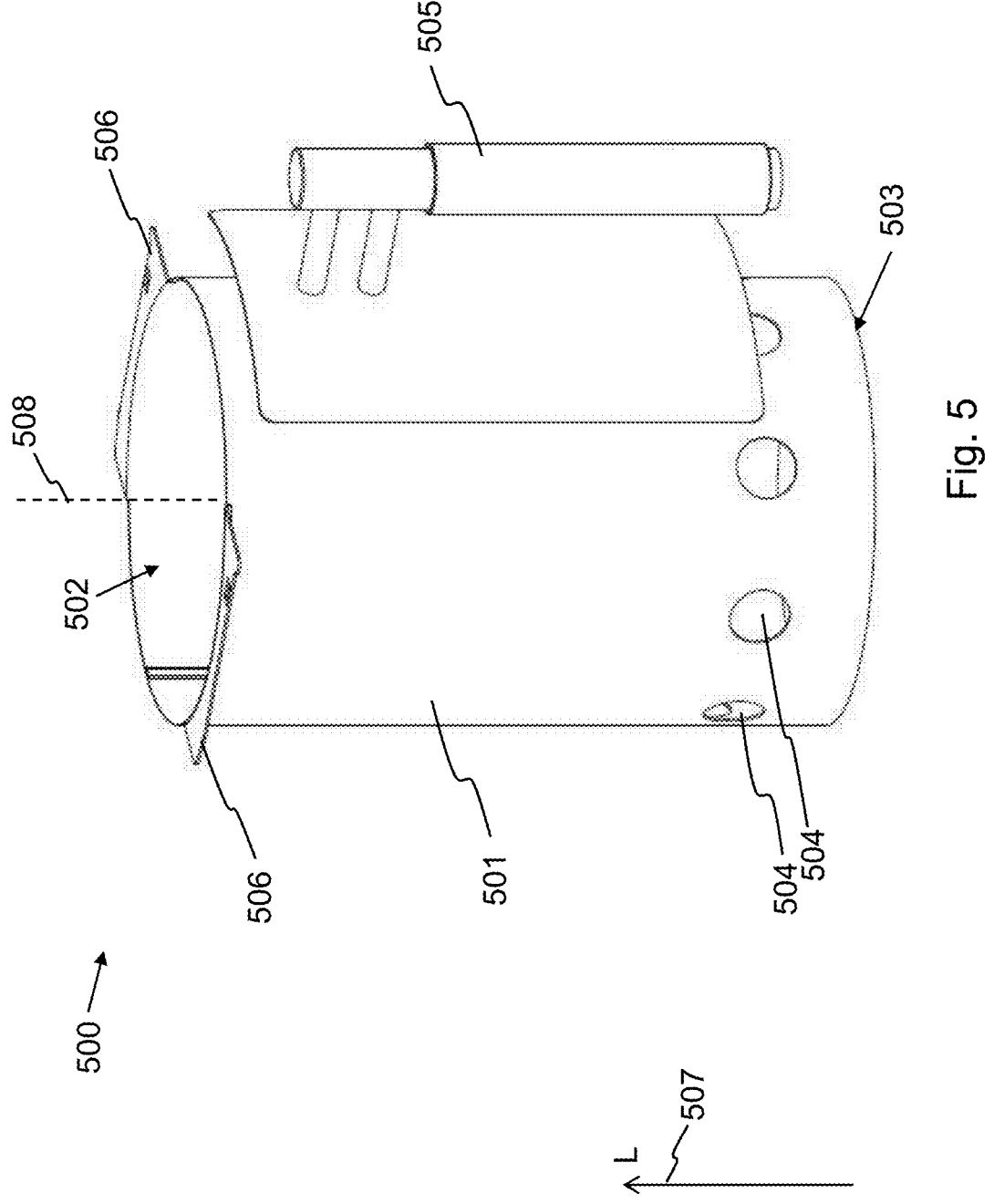
FIG. 5 and FIG. 6 show a coal starter according to an embodiment of the invention.
Figure 6:
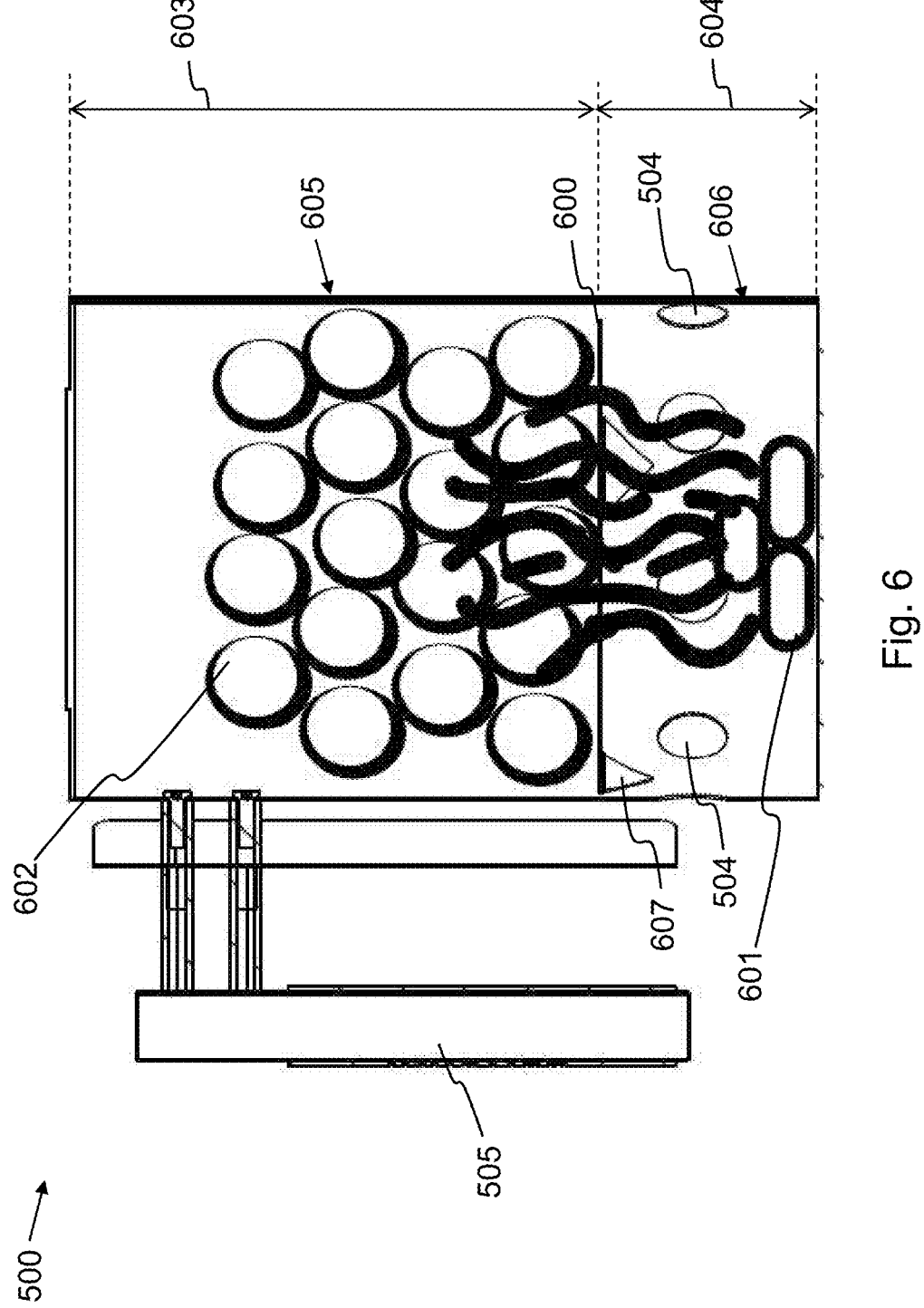

FIGS. 5 to 8 show the elements of the assembly 101 in more detail. The assembly 101 comprises a coal starter 500 and an insert 700. FIG. 5 and FIG. 6 show that the coal starter 500 comprises a tubular wall 501. The wall 501 is cylindrical in the shown embodiment, having a central axis 508 along the axial direction or the length direction 507. The tubular wall 501 has open ends 502 and 503, wherein these ends 502, 503 are opposite along the length direction 507. The coal starter 500 has thus an open, not-closed top, and an open, not-closed bottom 503. Holes 504 are arranged in the tubular wall 501, along the circumferential direction of the coal starter 500. The coal starter has furthermore a handle 505, fixedly connected to the tubular wall 501. Furthermore, flat platelets 506 are applied at the top of the tubular wall 501, fixedly connected to the wall 501 and located perpendicular to the length direction 507. The set of opposite flat platelets 506 serves as connecting element, as will be further explained below.

The cross section of FIG. 6 shows that a grid 600 is positioned inside the tubular wall 501, adapted to place new coals 602 to be lit. The grid 600 is supported by supporting elements 607. The grid 600 forms the separation between an upper portion 605 and a lower portion 606 of the coal starter 500. The upper portion 605 is delimited by a first portion of the tubular wall 501, wherein that first portion has a length 603. The lower portion 606 is delimited by a second portion of the tubular wall 501, wherein that second portion has a length 604. The figure shows that the length 603 is greater than the length 604; in other words, the grid is located closer to the bottom 503 than to the top 502. The holes 504 are located in the wall of the lower portion 606. In the shown embodiment, no holes are present in the wall of the upper portion 605. Note that in FIG. 6 the coal starter 500 is shown positioned on a surface but end 503 is nevertheless open at the bottom. Except for the presence of connecting elements 506, the design of the coal starter 500 is analogous to the design of a classical individual coal starter, of which examples are described in U.S. Pat. Nos. 3,167,040, 3,934, 520 and 5,197,455.

Figure 7:
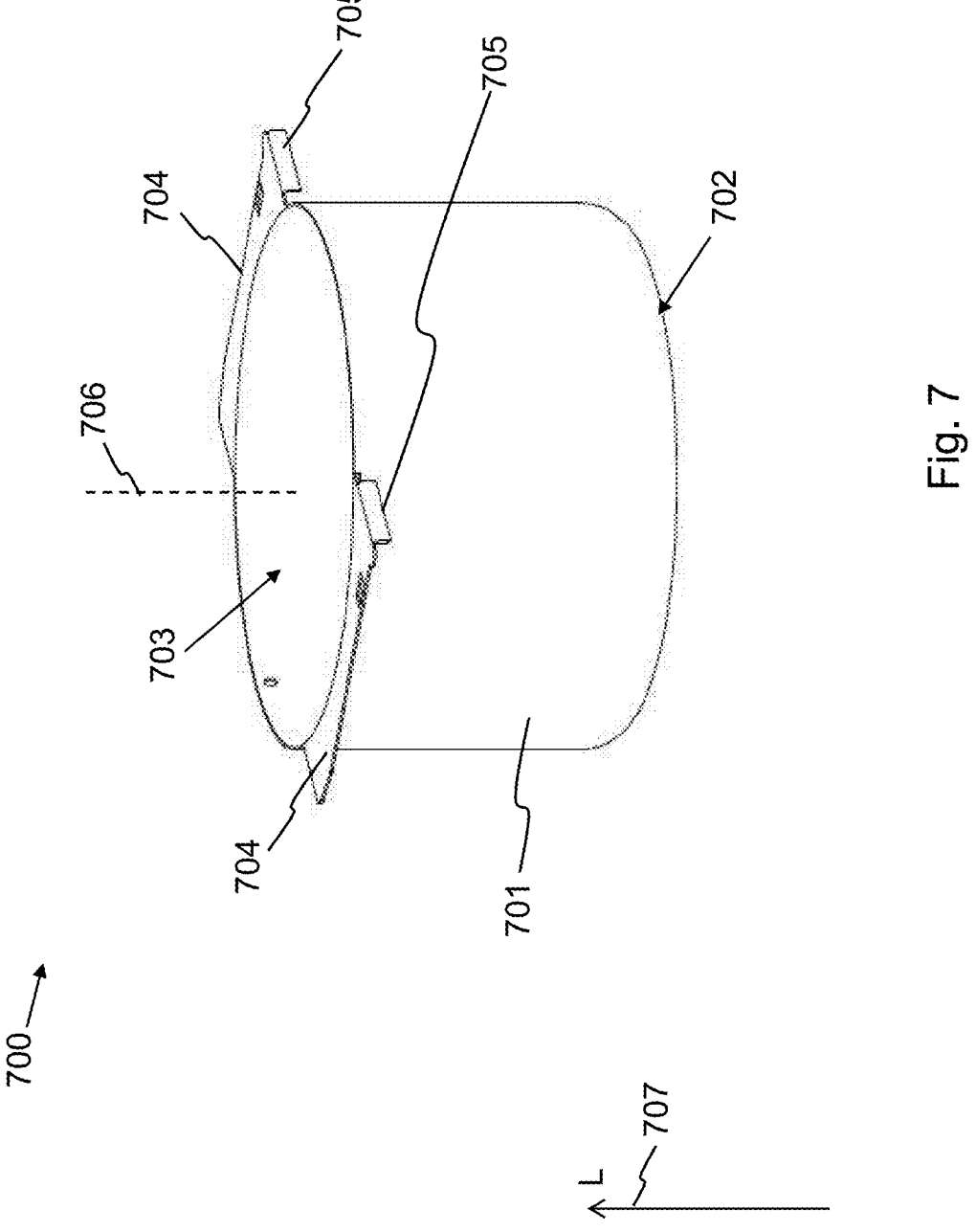
FIG. 7 shows an insert according to an embodiment of the invention.

FIG. 7 shows an embodiment of the insert 700. The insert 700 comprises a pot having a closed bottom 702, upright wall 701 and open top 703. The upright wall 701 is cylindrical, having a central axis 706 along the length direction or axial direction 707. Flat platelets 704 are located at the top of the upright wall 701, fixedly connected to the wall 701 and located perpendicular to the length direction 707. Each platelet 704 has an edge or rim 705 at one side, extending in a plane parallel to the length direction 707. The set opposite flat platelets 704 having edges 705 serves as second connecting element, as will be further explained below.

Figure 8B:
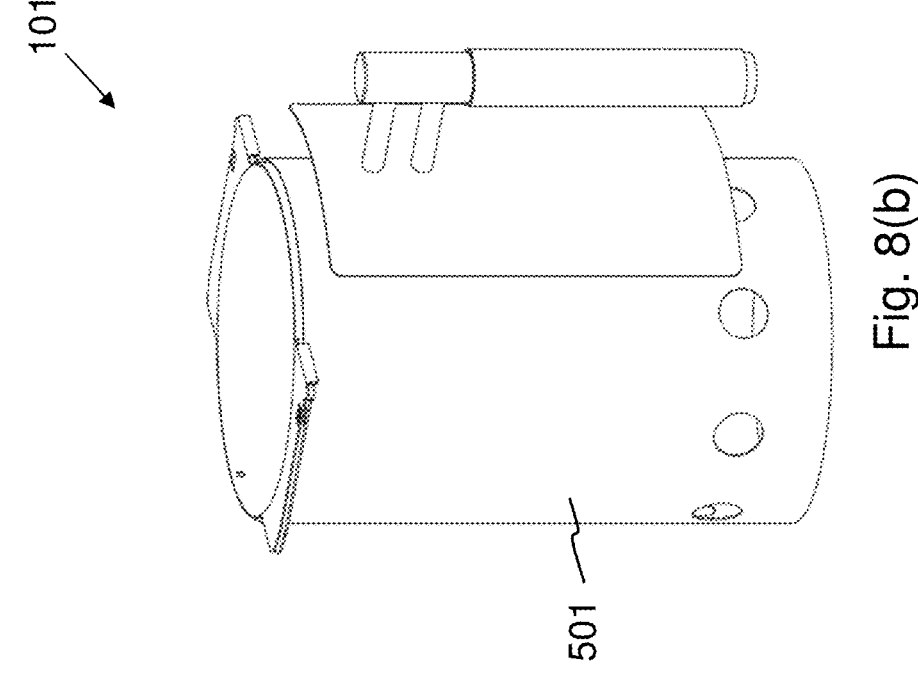
FIG. 8(b) shows an assembly according to an embodiment of the invention, with the insert in positioned state.
Figure 8A:
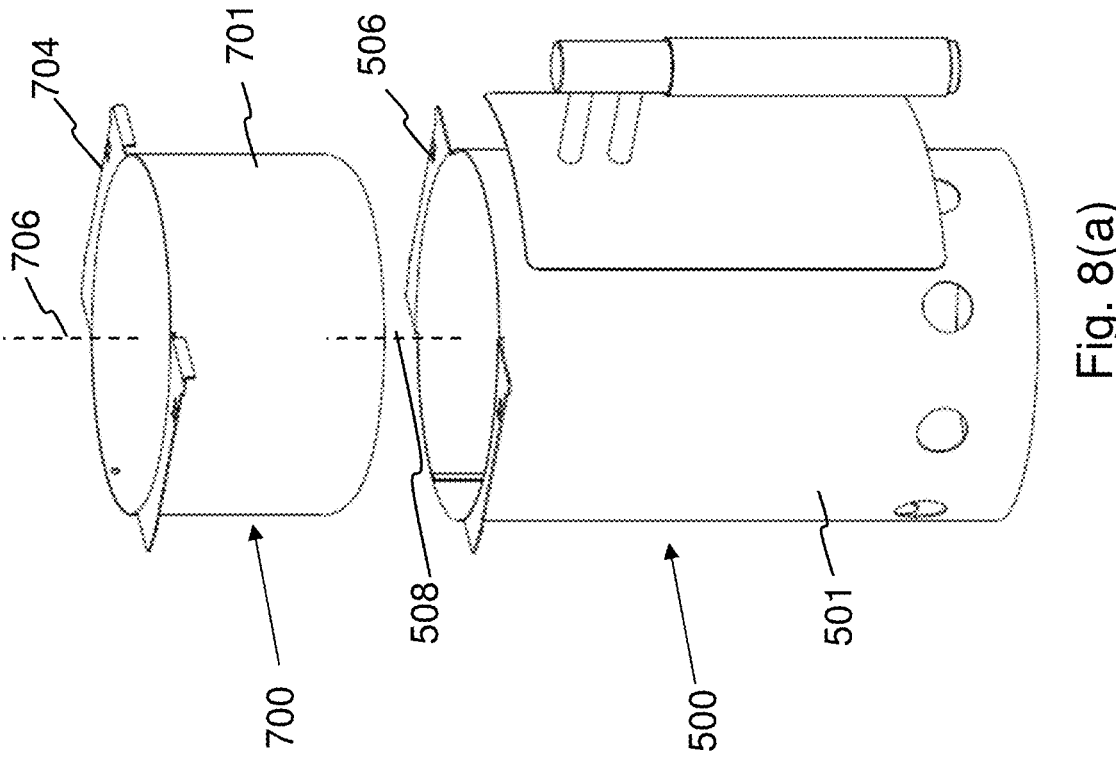
FIG. 8(a) illustrates how an insert may be positioned inside the coal starter, according to an embodiment of the invention.

FIGS. 8(*a*) and 8(*b*) illustrate that the insert 700 may be positioned inside the coal starter 500. The insert 700 is herein slid along the open top 502 of the coal starter 500 into the tubular wall 501. After positioning, the wall 701 of the insert 700 is concentrical with the tubular wall 501 of the coal starter 500, with a common central axis 706, 508. The length of the insert 700, measured along the length direction 707, is smaller than the length 603 of the upper portion 605 of the coal starter 500. In a positioned state, the bottom 702 of the insert 700 is thus located above the grid 600 of the coal starter 500, as is also visible in the cross section of FIG. 11. In the positioned state, the platelets 704 of the insert 700 furthermore lie on top of the platelets 506 of the coal starter 500, as is visible in FIG. 8(*b*). In this way, the insert 700 is suspended within the coal starter 500. The insert 700 is, through the platelets 704, supported by the coal starter 500, and there is contact between the platelets 704 of the insert 700 and the platelets 506 of the coal starter 500. FIG. 8(*b*) shows also that, in the positioned state, the wall 701 of the insert 700 is located almost completely inside the tubular wall 501 of the coal starter 500.

Figure 9:
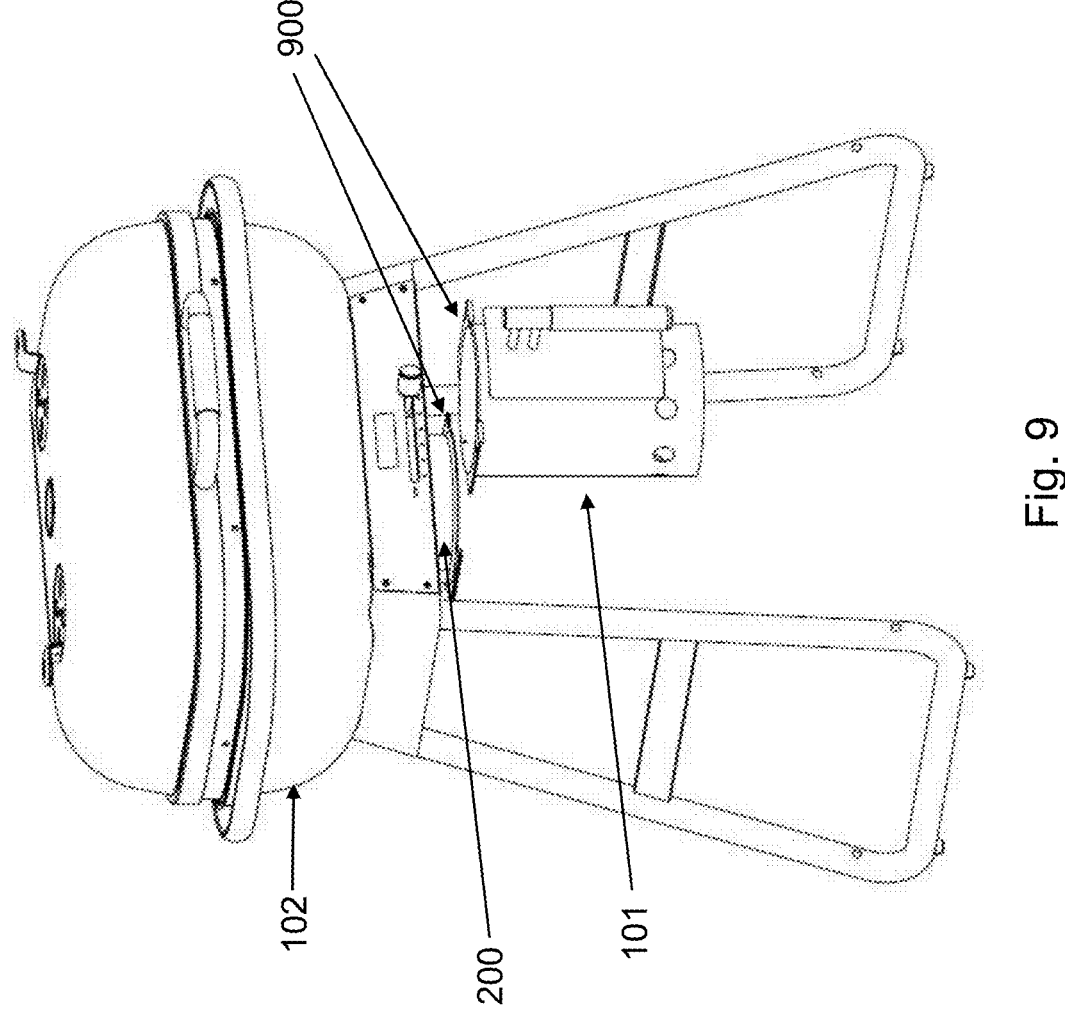
FIG. 9 illustrates how the assembly may be suspended and detached, according to an embodiment of the invention.
Figure 10:
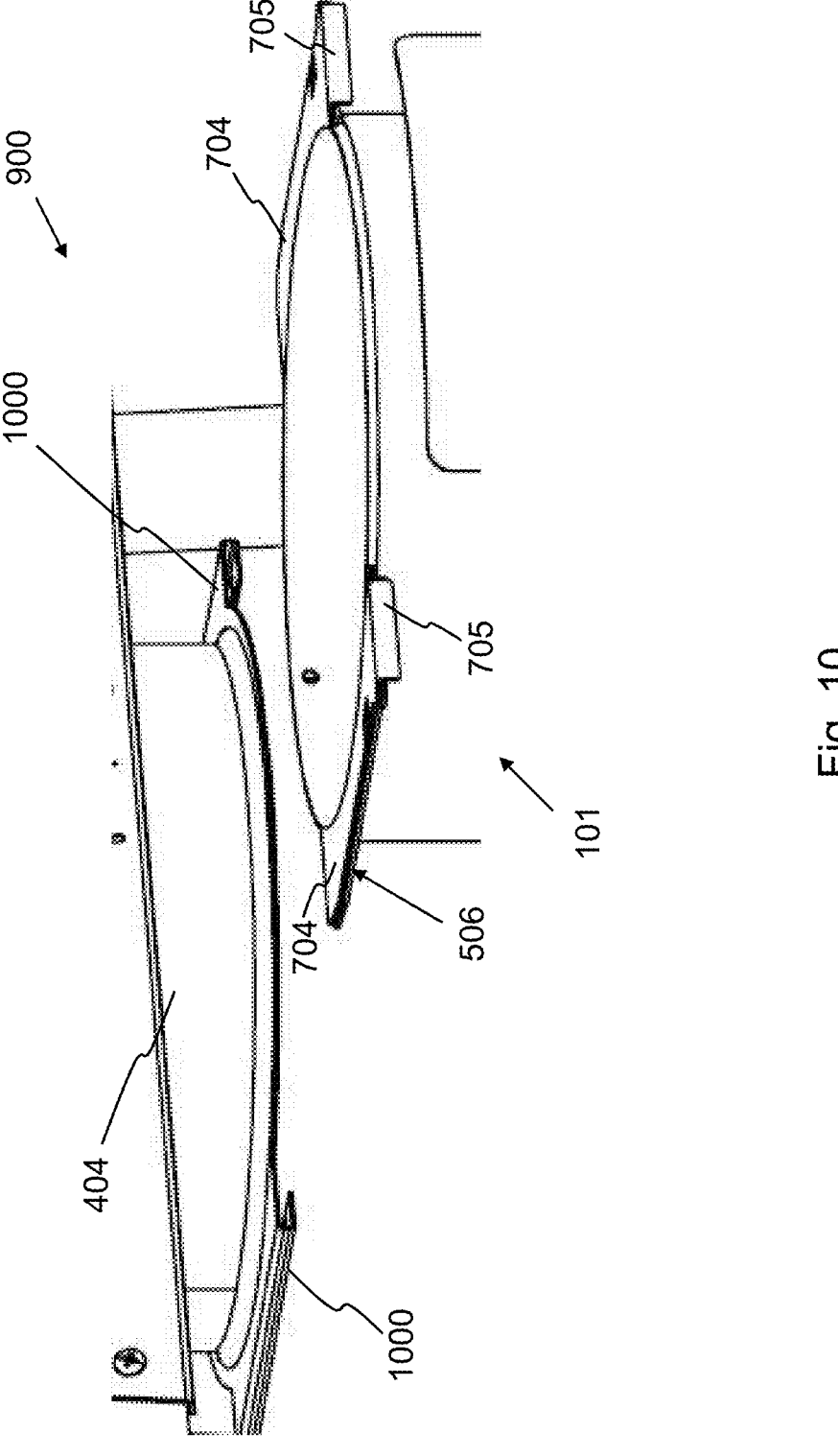
FIG. 10 shows in more detail a detachable connection, adapted to suspend the assembly below the tub of the barbecue, according to an embodiment of the invention.
Figure 11:
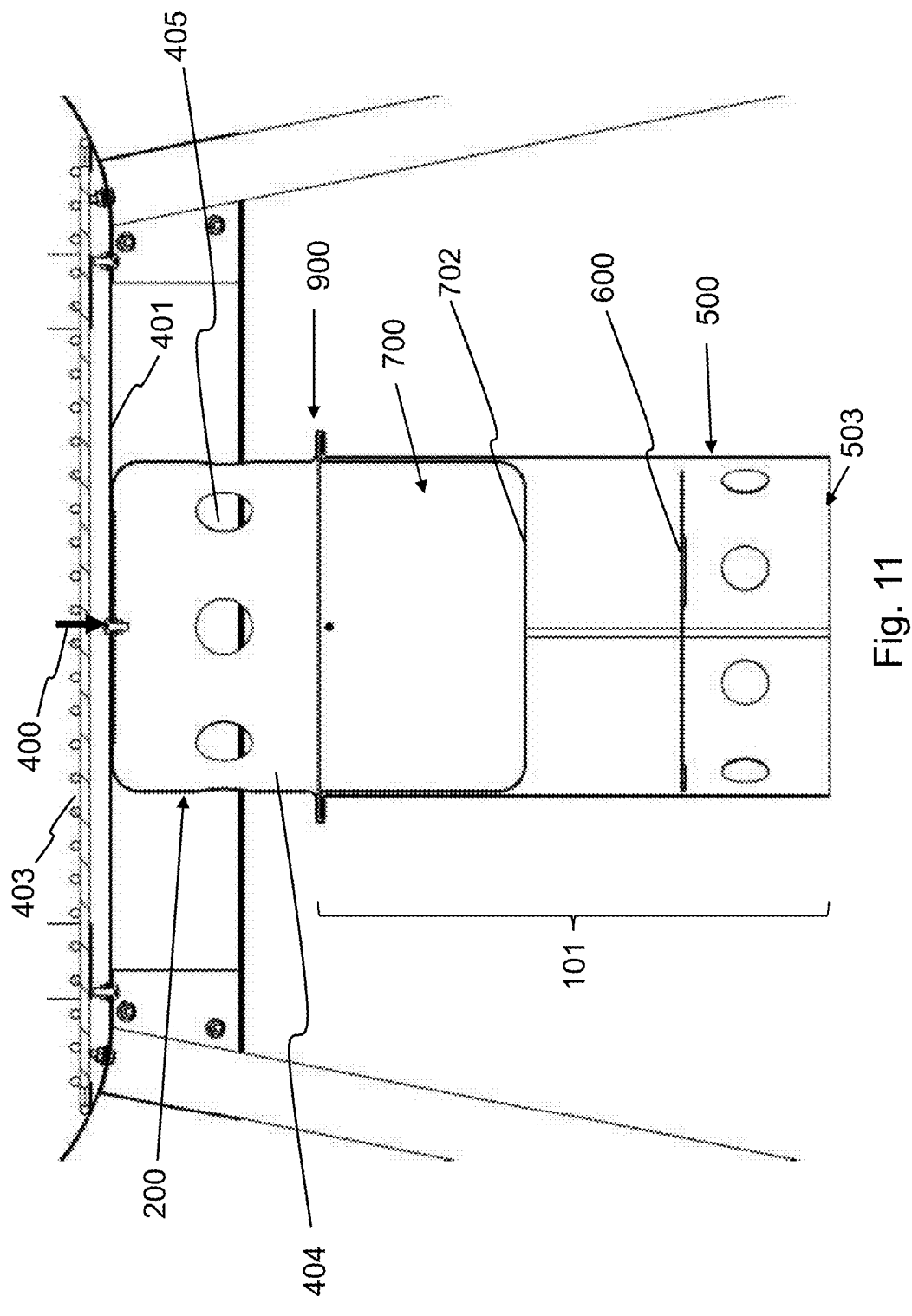
FIG. 11 shows the assembly in suspended state, as it is used during actual barbecuing, according to an embodiment of the invention.

FIG. 9 and FIG. 10 show how the assembly 101, with the insert 700 positioned in the coal starter 500, may be suspended below the tub 102, by means of a detachable connection 900. More specifically, the assembly 101 is suspended below the air supplying component 200, with the tubular wall 501 in the extension of the ring 404. The air supplying component 200 comprises to that end two opposite connecting elements 1000, fixedly connected to the bottom side of the ring 404. Each of the connecting elements 1000 of the air supplying component 200 forms a groove, adapted to receive the stacked platelets 506, 704 of the assembly 101. The edges 705 ensure that the platelets 506 and 704 get nicely stacked on top of each other when positioning the insert 700 into the coal starter. The edges 705 also determine to which extent the stacked platelets 506, 704 have to be slid into the grooves 1000, so that the assembly 101 lies nicely in the extension of the air supplying component 200. FIG. 11 shows the assembly 101, with positioned insert 700, after suspending it below the air supplying component 200 by means of the detachable connection 900.

Figure 12:
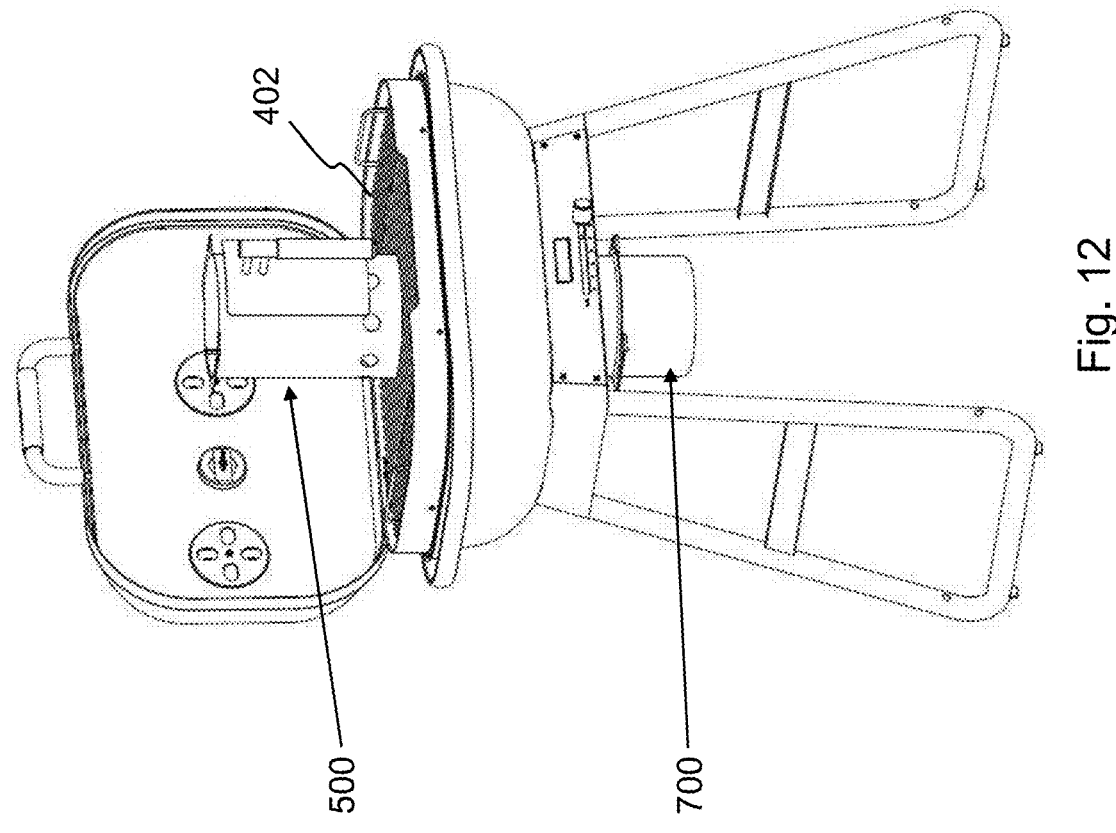
FIG. 12 and FIG. 13 illustrate how the coal starter may be used for lighting fresh coals, according to an embodiment of the invention.
Figure 13:
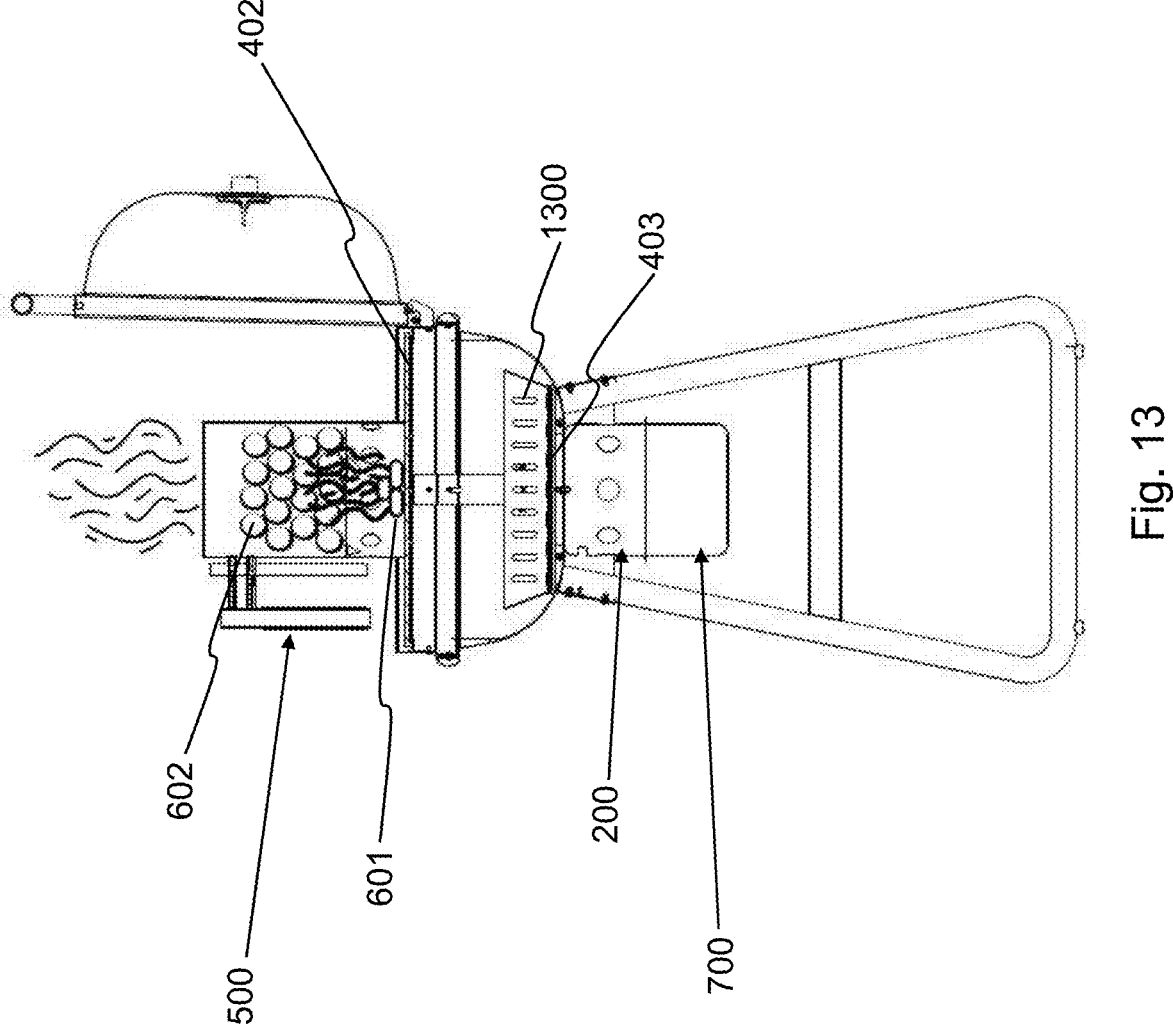

The assembly 101 may fulfill both the function of coal starter, and the function of ashtray. To be used as coal starter, the assembly 101 is detached, as shown in FIG. 9. The assembly 101 is for this purpose handled by means of handle 505, and thus slid out of grooves 1000. The insert 700 is then removed, see FIG. 8(*a*), so that the individual coal starter 500 of FIG. 5 is obtained. This coal starter 500 may now be used for lighting fresh coals. For example, the coal starter 500 is positioned on top of the barbecue grid 402, as illustrated in FIG. 12 and FIG. 13. The lower portion 606 of the coal starter 500 is positioned over firelighters 601. The upper portion 605 of the coal starter 500 is filled with coals 602 to be lit, supported by the grid 600. The firelighters 601 are lit, and air is drawn through the holes 504. The tubular wall 501 acts as a chimney, wherein draft is generated and heat is distributed optimally over the coals 602.

In this way, coals 602 may be made to glow in an efficient way. Once the coals glow and start to form a white ash layer, they are removed from the coal starter 500, and distributed in the tub 102. The coal starter may be used during the starting phase, for lighting the first coals, or during actual barbecuing, for lighting an additional amount of coals.

FIG. 12 and FIG. 13 illustrate how, for the shown embodiment, the insert 700 may also be suspended separately below the tub 102. It suffices herein to slide the platelets 704 of the insert 101 into the grooves 1000 of the air supplying component 200, such that a second detachable connection is formed. In this way, the ashes formed by combustion of the firelighters 601, or optionally glowing coals already present in the tub 102, are collected in the insert 700 during the use of the coal starter 500. Thus, the insert 700 acts in this moment itself as a suspended ashtray.

During actual barbecuing, when food is lying on the grid 402 is cooked, the assembly 101 acts as ashtray. The insert 700 is for this purpose first positioned inside the tubular wall 501 of the coal starter 500, see FIG. 8(*a*). In that way, a bottom 702 is created inside the tubular wall 501 of the coal starter 500. The assembly 101 is then suspended below the air supplying component 200 by means of the detachable connection 900, see FIG. 9, by handling the handle 505 and sliding into the grooves 1000. The assembly 101 is then in the suspended state of FIG. 11. Ashes forming from the glowing coals in the tub 102 fall through the opening 400 and then through the air supplying component 200. Finally, they are collected in the suspended assembly 101. More specifically, the ashes are collected on the bottom 702 which was formed by the insert 700 inside the coal starter 500.

During barbecuing, the air supplying component 200 ensures the supply of air to the coals in the tub 102. Air is herein drawn in through the holes 405 in the ring 404. The air supplying component 200 has a lid positioned at the top of the ring 404, in which openings are applied. These openings let the drawn in air flow through the tub opening 400 to the glowing coals in the tub 102. The air supply is controllable by means of the operating button 106: by moving the handle 106, openings in the lid of the air suppling component 200 are closed to a larger or lesser extent. The air supply is hereby not hampered by the lower suspended assembly 101. By choosing the length of the insert 700 sufficiently large, it is furthermore avoided that collected ashes in the insert 700 are carried along with the air flow.

After finishing barbecuing, the assembly 101 is detached, so that the ashes collected inside the insert may be removed.

Although the present invention was illustrated by means of specific embodiments, it will be clear for the person skilled in the art that the invention is not limited to the details of the foregoing illustrative embodiments, and that the present invention may be executed with different modifications and adaptations without departing from the field of application of the invention. The present embodiments should therefore in all respects be considered as illustrative and not restrictive, wherein the field of application of the invention is described by attached claims and not by the foregoing description, and all modifications which fall inside the meaning and scope of the claims are therefore included. In other words, it is understood to include all modifications, variations or equivalents falling inside the scope of application of the underlying basic principles and of which the essential attributes are claimed in this patent application. Moreover, the reader of this patent application will understand that the words "comprising" or "to comprise" do not exclude other elements or other steps, and that the word "a(n)" does not exclude plural. Possible references in the claims may not be understood as a limitation of the respective claims. The terms "first", "second", "third", "a", "b", "c" and the like, when used in the description or in the claims, are used to distinguish between similar elements or steps and do not necessarily describe a successive or chronological order. The terms "top", "bottom", "over", "under" and the like are used in the same way with respect to the description and do not refer necessarily to relative positions. It should be understood that these terms are mutually interchangeable under the right conditions and the embodiments of the invention are able to function according to the present invention in other orders or orientations than those described or illustrated in the above.

The invention claimed is:

1. A charcoal barbecue, comprising:
a tub mounted on one or multiple legs and adapted to place pieces of solid fuel,
wherein at least one opening is present in the bottom of said tub adapted for outflow of formed ashes;
an assembly with combined coal starter and ashtray function, adapted to be suspended below said opening by means of a detachable connection, said assembly comprising:
a coal starter comprising:
a tubular wall, having one or multiple holes arranged in said wall,
openings at both opposite ends of said tubular wall, and a grid positioned inside said tubular wall,
an insert, adapted to be removably positioned at least partially inside said tubular wall, such that in positioned state of said insert a closed bottom is formed inside said tubular wall,
wherein said assembly is such that:
by positioning said insert and suspending said assembly below said opening, said assembly functions as an ashtray, being adapted to collect ashes falling from said opening, and
by detaching said assembly and removing said insert, said coal starter is obtained, being adapted to heat pieces of solid fuel when said pieces are placed on said grid of said coal starter.

2. The charcoal barbecue according to claim 1, wherein said assembly is adapted to switch between said coal starter and ashtray function,
wherein said ashtray function is obtained by sliding said insert at least partially into said tubular wall, and said coal starter function is obtained by sliding said insert out of said tubular wall.

3. The charcoal barbecue according to claim 1, wherein coal starter comprises an upper and lower portion, separated by said grid,
wherein said upper portion is delimited by a first portion of said tubular wall, and said lower portion is delimited by a second portion of said tubular wall, and
wherein the length of said first portion, measured along the central axis of said tubular wall, is greater than the length of said second portion.

4. The charcoal barbecue according to claim 3, wherein at least some of said holes are located in said second portion of said tubular wall.

5. The charcoal barbecue according to claim 3, wherein in a positioned state of said insert, said bottom of said ashtray is located in said upper portion.

6. The charcoal barbecue according to claim 1, wherein said coal starter comprises a connecting element fixedly connected to said tubular wall, adapted to form said detachable connection.

7. The charcoal barbecue according to claim 1, wherein said coal starter comprises a handle fixedly connected to said tubular wall.

8. The charcoal barbecue according to claim 1, wherein said insert comprises a pot, said pot comprising a closed bottom, an upright wall, and an opening located opposite said bottom.

9. The charcoal barbecue according to claim 8, wherein in a positioned state of said insert said wall of said pot is concentric with said tubular wall of said coal starter.

10. The charcoal barbecue according to claim 8, wherein said insert comprises a second connecting element fixedly connected to said wall of said pot, adapted to suspend said pot below said opening in said tub by means of a second detachable connection.

11. The charcoal barbecue according to claim 1, wherein said charcoal barbecue comprises an air supplying component, said air supplying component comprising a ring having one or multiple holes in the wall of said ring, and
wherein said ring is connected to the bottom of said tub, around said opening for outflow of formed ashes.

12. The charcoal barbecue according to claim 11, wherein said assembly is in suspended state detachably connected to said air supplying component.

13. The charcoal barbecue according to claim 1, wherein said charcoal barbecue comprises multiple legs, and
wherein said assembly is in suspended state located at a central position between said legs.

14. A method of use of a charcoal barbecue, comprising:
providing a charcoal barbecue comprising a tub positioned on one or multiple legs,
wherein at least one opening is present in the bottom of said tub;
providing an assembly adapted to be suspended below said opening by means of a detachable connection, said assembly comprising:
a coal starter, comprising a tubular wall having one or multiples holes arranged in said wall, openings at both opposite ends of said tubular wall, and a grid positioned inside said tubular wall;
an insert adapted to be removably positioned at least partially inside said tubular wall, such that in positioned state of said insert a closed bottom is formed inside said tubular wall;
using said assembly as individual coal starter, comprising:
detaching said assembly, such that it is in a not-suspended state;
removing said insert from said tubular wall;
placing pieces of solid fuel on said grid;
heating said pieces of solid fuel by means of ignition material placed inside said tubular wall below said grid,
using said assembly as ashtray, comprising:
positioning said insert at least partially inside said tubular wall, such that an ashtray having a closed bottom is formed;
suspending said assembly below said opening in said tub;
providing pieces of glowing solid fuel in said tub, wherein formed ashes are discharged through said opening in said tub
collecting ashes in said ashtray, said ashes falling from said opening.

* * * * *